UNITED STATES PATENT OFFICE.

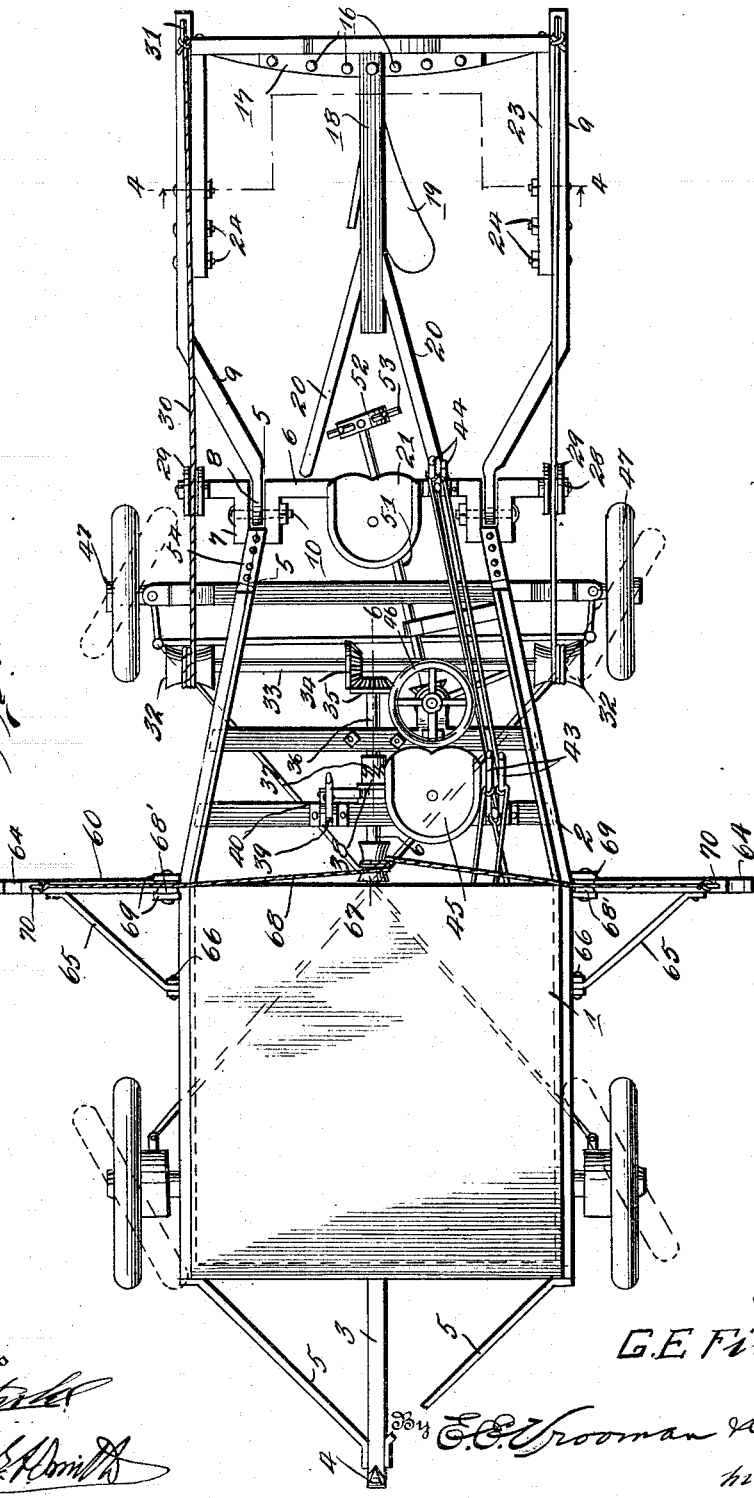

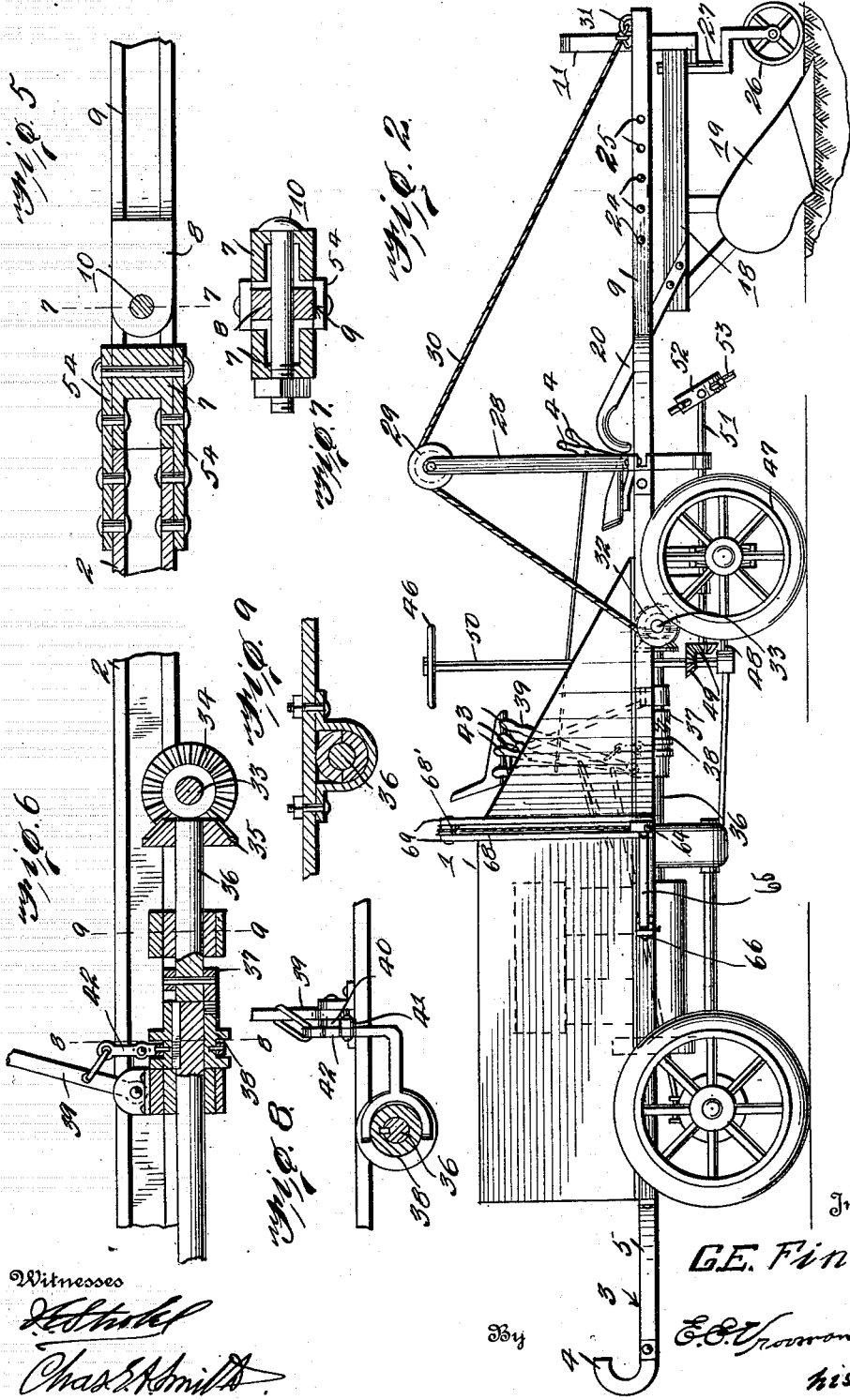

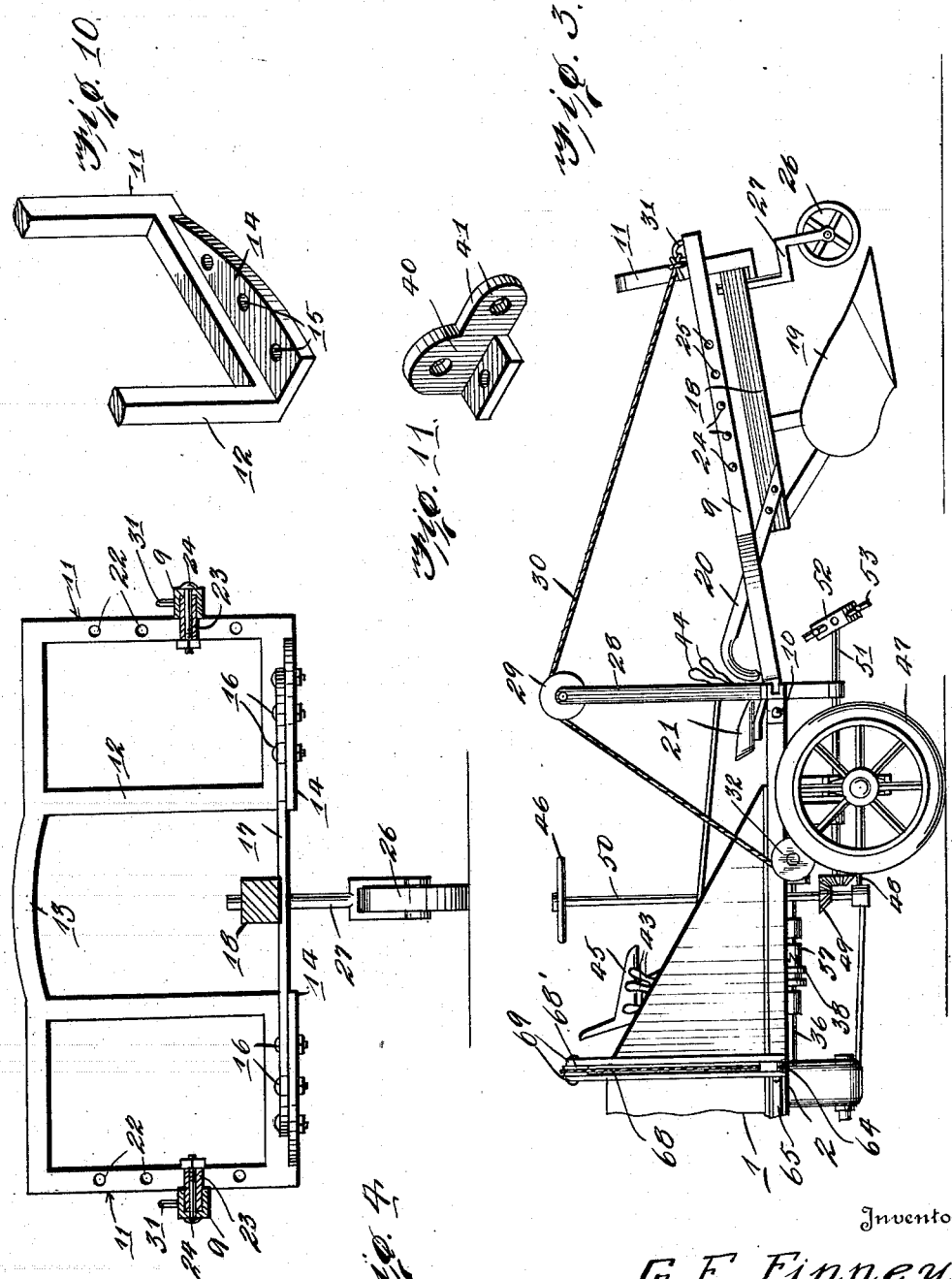

GEORGE E. FINNEY, OF RUSTON, LOUISIANA.

DERRICK FOR USE UPON VEHICLES.

1,264,289.  Specification of Letters Patent.  Patented Apr. 30, 1918.

Application filed April 24, 1916. Serial No. 93,224.

*To all whom it may concern:*

Be it known that I, GEORGE E. FINNEY, a citizen of the United States of America, residing at Ruston, in the county of Lincoln and State of Louisiana, have invented certain new and useful Improvements in a Derrick for Use upon Vehicles, of which the following is a specification, reference being had therein to the accompanying drawing.

This invention relates to derricks for tractors or vehicles and is especially adapted for use upon plowing machines and has for its object the production of a simple and efficient means for supporting a plow upon the front of an automobile tractor in such a manner as to permit the plow and plow frame to be elevated or raised while the automobile tractor is passing from place to place without using the plow.

Another object of this invention is the production of a simple and efficient means for facilitating the raising and lowering of the plow supporting frame.

With these and other objects in view this invention consists of certain novel combinations, constructions, and arrangements of parts as will be hereinafter fully described and claimed.

In the accompanying drawings:—

Figure 1 is a top plan view of the tractor.

Fig. 2 is a side elevation thereof.

Fig. 3 is a side elevation of a portion of the tractor showing the plow frame partly raised or elevated.

Fig. 4 is a section taken on line 4—4, of Fig. 1.

Fig. 5 is a section taken on line 5—5, of Fig. 1.

Fig. 6 is a section taken on line 6—6, of Fig. 1.

Fig. 7 is a section taken on line 7—7, of Fig. 5.

Fig. 8 is a section taken on line 8—8, of Fig. 6.

Fig. 9 is a section taken on line 9—9, of Fig. 6.

Fig. 10 is a perspective view of the lower portion of the front end of the plow beam supporting frame.

Fig. 11 is a detail perspective of the bracket supporting the clutch throwing lever.

By referring to the drawing it will be seen that 1 designates the autotmobile tractor which is provided with the usual body 2, and has a rearwardly extending frame 3 provided with an upwardly turned hook 4 for the purpose of permittting a trailer to be attached thereto. A plurality of diverging braces 5 are secured to the rear end of the body or frame 2 to constitute a brace for the hook 4.

The forward end of the frame 2 is contracted and supports a transversely extending bracing bar 6, which transversely extending bracing bar 6 is provided with rearwardly extending yoke portions 7, within which yoke portions 7 are pivotally secured the reduced ends 8 of the plow supporting frame 9 by means of the bolts 10. The plow supporting frame 9 is substantially rectangular in shape, having its rear ends slightly converging as illustrated in Fig. 1, and the forward ends of the frame 9 support a front frame 11 which comprises a pair of rectangular ends 12 which are connected at their upper ends by means of an arc yoke 13. The end portions 12 of the frame 11 are provided with rearwardly extending flange portions 14 having a plurality of apertures 15 formed therein for the purpose of receiving the bolts 16 carried by the plow beam supporting bar 17. A plow beam 18 is connected to the bar 17, and this plow beam is of the usual construction and supports a plow 19. The beam 18 is provided with rearwardly extending handles 20 to constitute hand-holds for the operator of the machine adapted to be seated upon the seat 21 supported upon the bar 6.

The end portions 12 of the frame 11 are each provided with a plurality of adjusting apertures 22 for permitting the front frame 11 to be adjustably connected to the side bars 23 bolted to the frame 9. The side bars 23 are securely fastened to the side portions of the frame 9 by means of the bolts 24 passing through the adjusting apertures 25 formed in the side rails or members of the frame 9.

A plurality of supporting rollers 26 are supported upon the front end of the front frame 11, and these rollers 26 are connected to the standards 27.

A plurality of vertically extending standards 28 are carried by the front end of the frame 2, and these standards 28 carry pulleys 29 over which the cables 30 pass. These cables 30 are connected to the forward end of the frame 9 by means of the eyelets or eyes 31, and the opposite ends of the cables 30 are secured to and pass around the drums 32 carried by the winding shaft 33. It will, therefore, be seen that as the shaft 33 is driven in one direction the cables 30 will be drawn around the drums 32 and thereby raise the forward end of the frame 9 to the position shown in Fig. 3 so as to be out of the way while the device is being transported from place to place. It, of course, should be understood that the frame 9 may be even raised to a greater distance than that shown in Fig. 3. A driving gear 34 is carried by the shaft 33 and meshes with a gear 35 carried by the shaft 36. A clutch 37 is carried by the shaft 36 and is adapted to be engaged by a sliding clutch 38 operated by means of a clutch throwing lever 39. The clutch throwing lever 39 is carried by a supporting bracket 40, which bracket 40 is provided with a projecting nose 41 for supporting the bell crank arm 42 adapted to actuate the clutch 38.

It, of course, should be understood that the usual engine operating levers 43 are employed, which levers are provided with extension levers 44 to permit the engine to be operated either from the forward seat 21 or the rear driving seat 45. A hand steering wheel 46 is placed in front of the rear driving seat 45 and is adapted to steer the front wheels 47 through the medium of the rods 48. Gears 49 are carried by the steering shaft 50 and the auxiliary steering shaft 51, and a foot steering wheel 52 is carried by the auxiliary shaft 51 having a plurality of radiating fingers 53 to permit the driver of the machine to steer the device with his feet as is obvious.

By carefully considering Figs. 5 and 7 it will be understood that the forward ends of the frame 2 are provided with caps 54 for the purpose of reinforcing the outer ends of the frame 2 and constituting an efficient means for connecting the bar 6 to the frame 2.

An arm 60 is secured to the body 1 of the vehicle and is pivotally mounted upon a pin 62 passing through the bracket arm 63. This arm 63 is provided with the hook 64 upon the outer end thereof for the purpose of permitting a cultivator to be attached thereto, thereby permitting three rows to be cultivated at a time. A brace arm 65 is connected to the arm 60 and is pivotally connected to the body 1 between the ears 66 as illustrated in Fig. 1 of the drawings.

An auxiliary drum 67 is carried by the shaft 6, and a cable 68 is wound around the drum 67 and passes over a pulley 68' carried by the standard 69, and is secured at its opposite end to the arm 60 at the point marked 70 in Fig. 1. It should be understood that one of the arms 60 extends to each side of the machine, and these arms are raised and lowered in accordance with the desire of the operator and swung from an operative to an inoperative position by means of winding the cable 68 upon the drum 67.

Having thus described the invention what is claimed as new, is:—

A derrick for use upon a vehicle comprising a support, drums carried by said support, a transversely extending bracing bar carried by said support, yoke members formed upon said transversely extending bracing members, a yoke frame provided with inwardly inclined ends, the inner ends of said yoke frame fitting within said yoke members, an article supporting bar interposed between the outer ends of said yoke frame, and being adjustably mounted thereon, vertical standards carried by the outer ends of said transversely extending bracing bar, pulleys carried by the upper ends of said vertically extending standards, cables secured to said drums and passing over said pulleys and being secured to the outer ends of said yoke frame, for raising said yoke frame to a vertical position.

In testimony whereof I hereunto affix my signature.

GEORGE E. FINNEY.

Copies of this patent may be obtained for five cents each, by addressing the "Commissioner of Patents, Washington, D. C."